US011733205B2

(12) United States Patent
Takahashi et al.

(10) Patent No.: US 11,733,205 B2
(45) Date of Patent: Aug. 22, 2023

(54) ELECTROPHORESIS APPARATUS

(71) Applicant: HITACHI HIGH-TECH CORPORATION, Tokyo (JP)

(72) Inventors: Satoshi Takahashi, Tokyo (JP); Ryoji Inaba, Tokyo (JP); Takashi Anazawa, Tokyo (JP); Tomoyuki Sakai, Tokyo (JP); Yusuke Goto, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 328 days.

(21) Appl. No.: 17/253,805

(22) PCT Filed: Jun. 22, 2018

(86) PCT No.: PCT/JP2018/023894
§ 371 (c)(1),
(2) Date: Dec. 18, 2020

(87) PCT Pub. No.: WO2019/244358
PCT Pub. Date: Dec. 26, 2019

(65) Prior Publication Data
US 2021/0262980 A1 Aug. 26, 2021

(51) Int. Cl.
*G01N 27/453* (2006.01)
*G01N 27/447* (2006.01)
(Continued)

(52) U.S. Cl.
CPC . *G01N 27/44756* (2013.01); *G01N 27/44721* (2013.01); *G01N 30/74* (2013.01); *G01N 2021/6463* (2013.01)

(58) Field of Classification Search
CPC ..... G01N 27/44721; G01N 2021/0106; G01N 2021/6417; G01N 2021/6463;
(Continued)

(56) References Cited

U.S. PATENT DOCUMENTS 4,927,265 A * 5/1990 Brownlee ............... G01N 21/64
204/603
5,235,409 A * 8/1993 Burgi ..................... G01N 30/74
204/603
(Continued)

FOREIGN PATENT DOCUMENTS

JP 09-105738 A 4/1997
JP 09-243598 A 9/1997
(Continued)

OTHER PUBLICATIONS

Partial European Search Report dated Feb. 8, 2022 for European Patent Application No. 18923401.6.
(Continued)

*Primary Examiner* — Alexander S Noguerola
(74) *Attorney, Agent, or Firm* — Volpe Koenig

(57) ABSTRACT

The present invention aims to provide an electrophoresis apparatus which makes it possible to execute protein analysis with a high throughput. The electrophoresis apparatus according to the present invention is equipped with a capillary array which is configured by arraying a plurality of capillaries, a measurement light irradiation unit which irradiates with measurement light, a first lens array which includes a plurality of first lenses which are arrayed in correspondence with the plurality of capillaries, a second lens array which includes a plurality of second lenses which are arrayed in correspondence with the plurality of capillaries, and a light receiving unit which receives light which is incident upon the capillaries via the first lens array from the measurement light irradiation unit via the second lens array.

9 Claims, 10 Drawing Sheets

(51) Int. Cl.
*G01N 30/74* (2006.01)
*G01N 21/64* (2006.01)

(58) Field of Classification Search
CPC ...... G01N 21/64; G01N 21/645; G01N 30/74; G01N 2021/6467; G01N 2021/6469; G01N 2021/6484; G01N 2021/6486
See application file for complete search history.

(56) References Cited

U.S. PATENT DOCUMENTS

| | | | |
|---|---|---|---|
| 5,395,502 A * | 3/1995 | Pawliszyn | G01N 27/44721 204/603 |
| 5,414,508 A * | 5/1995 | Takahashi | G01N 21/0303 204/603 |
| 5,578,179 A * | 11/1996 | Demorest | G01N 27/44752 204/454 |
| 5,582,705 A | 12/1996 | Yeung et al. | |
| 5,636,017 A * | 6/1997 | Bruno | G01N 30/74 356/440 |
| 5,900,934 A | 5/1999 | Gilby et al. | |
| 6,017,765 A | 1/2000 | Yamada et al. | |
| 6,191,425 B1 | 2/2001 | Imai | |
| 6,404,495 B1 * | 6/2002 | Melman | G02B 6/3652 204/451 |
| 6,759,662 B1 | 7/2004 | Li | |
| 7,419,578 B2 | 9/2008 | Sakai et al. | |
| 2003/0058440 A1 | 3/2003 | Scott et al. | |
| 2004/0026252 A1 | 2/2004 | Li | |
| 2005/0231718 A1 | 10/2005 | Goodall et al. | |
| 2010/0019157 A1 | 1/2010 | Furlan et al. | |
| 2011/0159499 A1 | 6/2011 | Hindson et al. | |
| 2016/0153936 A1 | 6/2016 | Miyata et al. | |
| 2017/0115223 A1 | 4/2017 | Yamazaki et al. | |

FOREIGN PATENT DOCUMENTS

| | | |
|---|---|---|
| JP | 10-239278 A | 9/1998 |
| JP | 2000-346828 A | 12/2000 |
| JP | 2004-325396 A | 11/2004 |
| JP | 2005-524051 A | 8/2005 |
| JP | 2005-535895 A | 11/2005 |
| JP | 2010-032513 A | 2/2010 |
| JP | 2013-524169 A | 6/2013 |
| JP | 2016-133373 A | 7/2016 |
| WO | 2015/005048 A1 | 1/2015 |
| WO | 2015/151812 A1 | 10/2015 |
| WO | 2018/000663 A1 | 1/2018 |

OTHER PUBLICATIONS

Mosulishvili, L.M. et al. "Enhancing Detection Sensitivity in Capillary Electrophoresis," Thesis, Andronikashvili Institute of Physics, Academy of Sciences of Georgia, Germany, (2000).

Huo., F., et al., "Pulsed multi-wavelength excitation using fiber-in-capillary light emitting diode induced fluorescence detection in capillary electrophoresis," Talanta, Oct. 1, 2010, vol. 83, pp. 521-526, doi: 10.1016/j.talanta.2010.09.047.

International Search Report, PCT/JP2018/023894, dated Sep. 18, 2018, 2 pgs.

European Search Report dated May 25, 2022 for European Patent Application No. 18923401.6.

* cited by examiner

ILLUMINATION LIGHT FOR ABSORBANCE MEASUREMENT (CONTINUOUS LIGHT AND SO FORTH OF 200nm TO 600nm IN WAVELENGTH)

TRANSMITTED LIGHT

ELECTROPHORESIS APPARATUS

TECHNICAL FIELD

The present invention relates to an electrophoresis apparatus.

BACKGROUND ART

An electrophoresis apparatus which uses capillaries for aiming at protein analysis and so forth is known (see, for example, Patent Literature 1). Conventionally, in a capillary electrophoresis apparatus for protein analysis which is provided to the market, the capillary for protein analysis is one and improvement of throughput is difficult. A device which can execute protein fluorescence intensity measurement and protein absorbance measurement in one device with a high throughput is desired.

CITATION LIST

Patent Literature

Patent Literature 1: International Publication No. 2015/005048

SUMMARY OF INVENTION

Technical Problem

The present invention aims to provide an electrophoresis apparatus which makes it possible to execute protein analysis with the high throughput.

Solution to Problem

The electrophoresis apparatus according to the present invention is equipped with a capillary array which is configured by arraying a plurality of capillaries, a measurement light irradiation unit which irradiates with measurement light, a first lens array which includes a plurality of first lenses which are arrayed in correspondence with the plurality of capillaries, a second lens array which includes a plurality of second lenses which are arrayed in correspondence with the plurality of capillaries, and a light receiving unit which receives light which is incident upon the capillaries via the first lens array from the measurement light irradiation unit via the second lens array.

Advantageous Effects of the Invention

According to the present invention, it becomes possible to execute the protein analysis with the high throughput.

DESCRIPTION OF EMBODIMENTS

In the following, present embodiments will be described with reference to the appended drawings. In the appended drawings, there are cases where the elements which are functionally the same as each other are denoted by the same number. Incidentally, although the appended drawings illustrate embodiments and implementation examples which conform to the principle of the present disclosure, these are used for understanding of the present disclosure and are never used for limited interpretation of the present disclosure. Description of the present specification is just typical illustration and does not limit the scope of patent claims or application examples of the present disclosure in any sense.

Although in the present embodiments, a detailed description which is sufficient for a person skilled in the art to embody the present disclosure is given, it is necessary to understand that other implementations and forms are possible and configurational and structural changing and replacement of various elements are possible without deviating from the scope and the spirit of the technical ideas of the present disclosure. Accordingly, the following description should not be interpreted by limiting it to this.

First Embodiment

Figure 1:
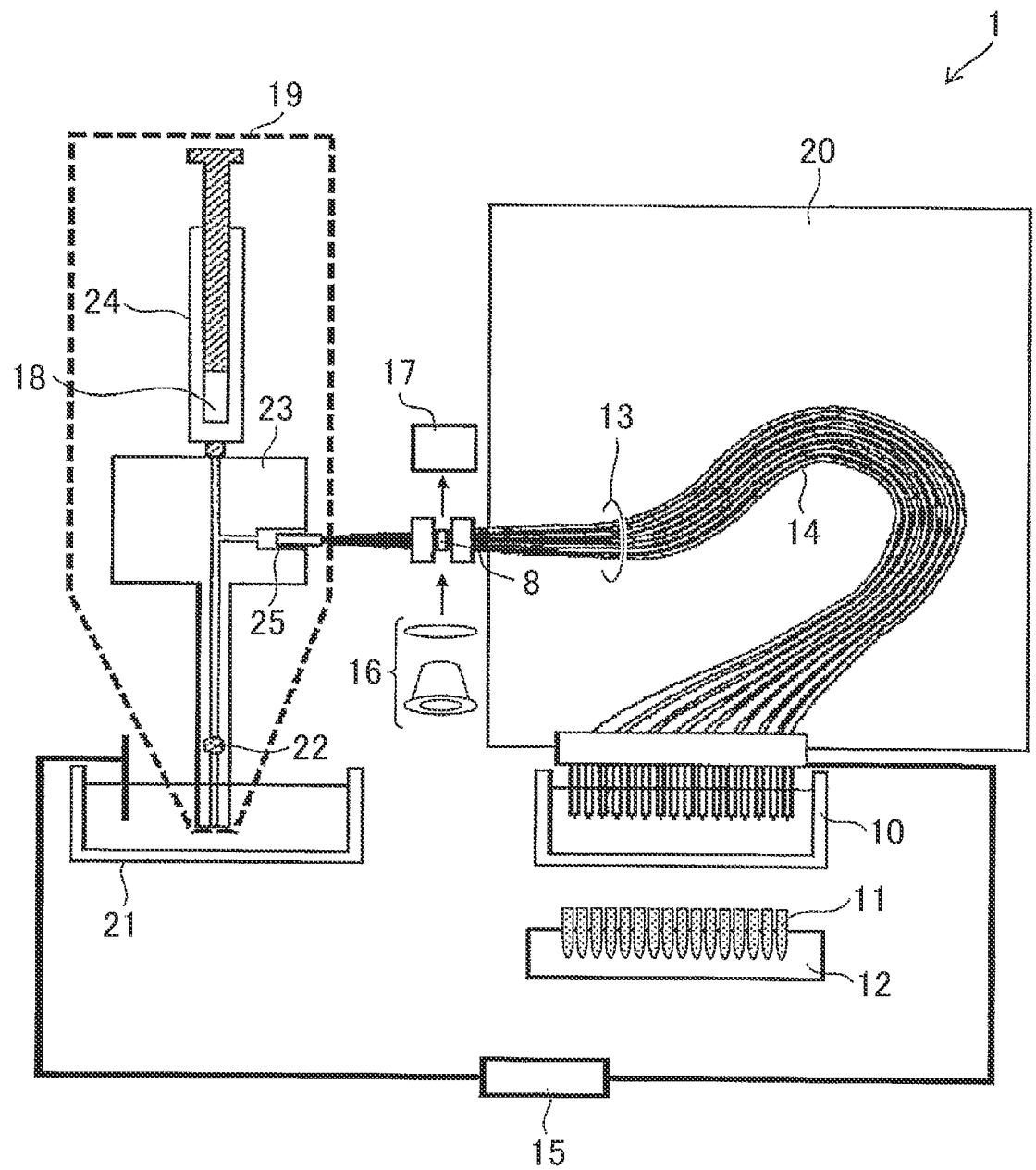
FIG. 1 is a schematic diagram of an entire configuration of a capillary electrophoresis apparatus of a first embodiment.

A schematic diagram of an entire configuration of a capillary electrophoresis apparatus 1 of the first embodiment is illustrated in FIG. 1.

The capillary electrophoresis apparatus 1 is equipped with a plurality of sample containers 11 for containing samples which are objects to be measured, a sample tray 12 which holds the sample containers 11, a capillary array 13 which is configured by a plurality of capillaries 14, a high-voltage power source 15 which applies a high voltage to the capillaries 14, an electrode bath 10 which holds a buffer liquid in which the sample-injection-side capillary array 13 and electrodes are immersed at the time of electrophoretic separation, an electrode bath 21 which holds the buffer solution on the side which is opposite to the sample injection side, a measurement light irradiation unit 16, a light receiving unit 17, a pump unit which injects an electrophoretic medium 18 into the capillaries 14, and a thermostatic bath 20 which maintains the inside of the capillaries 14 at a constant temperature.

The sample containers 11 and the electrode bath 10 are held on a movable carriage (not illustrated) and when the samples are introduced, the sample containers 11 move to an end of the capillary array 14 and the electrode bath 10 moves thereto at the time of phoretic separation. In addition, although not illustrated in the drawing, this capillary electrophoresis apparatus 1 is equipped with a control unit for controlling operations, a data processing unit, a display unit, a recording unit and so forth.

The capillary array 13 is configured by arraying the plurality (for example, 4, 8, 12, 24 and so forth) of quartz capillaries 14 which are tubular members and has a light irradiation area 8 on parts thereof. Although, in general, the capillaries 14 are coated with polyimide and so forth, coating is removed from the light irradiation area 8, coating removed parts are lined up and thereby the light irradiation area 8 is configured.

The measurement light irradiation unit 16 has a light source for irradiation of the light irradiation area 8 which is provided on the capillary array 13 with measurement light, and light-projecting optical system such as an optical fiber, a lens and so forth. In addition, the light receiving unit 17 is equipped with a light receiving element for receiving the measurement light which transmits through the light irradiation area 8 on the capillary array 13 and fluorescence from a phosphor which is applied to a component in the samples, and a light receiving optical system such as an optical fiber, a lens, a spectroscope and so forth.

The pump unit 19 which injects the electrophoretic medium (for example, a polymer aqueous solution) into the capillaries 14 has a connection section 25 with a gel block 23, a syringe 24, a valve 22, and the capillary array 13. When the polymer aqueous solution which is the phoretic medium is charged into each capillary 14, the capillary array 13 is coupled to the connection section 25, for example, by a control unit (not illustrated), the valve 22 is closed, the syringe 24 is pushed thereinto, and thereby the polymer aqueous solution in the syringe 24 is injected into the capillaries 14. The polymer aqueous solution is also charged into a phoretic path ranging from the valve 22 to the electrode bath 21 by a valve operation. Incidentally, although FIG. 1 illustrates an example that the valve 22 is an on/off valve, it is also possible to construct the valve 22 by a three-way valve and so forth.

As well known, sample introduction into the capillaries 14 can be performed by electric means, pressure application means and so forth. In a case where the sample is introduced by the electric means, it is performed by inserting the capillaries 14 and the electrode into a sample solution in the sample containers 11 and applying the voltage between it and the electrode bath 21. Then, they are repacked from the sample containers 11 to the common electrode bath 10.

When the voltage is applied from the high-voltage power source 15, the component in the sample moves toward the electrode bath 21 in the capillaries 14 while separating in accordance with properties such as a molecular weight and so forth by electrophoresis. The component which moves is irradiated with the measurement light by the measurement light irradiation unit 16 on the light irradiation area 8 which is provided on the capillaries 14 and the fluorescence which is applied to the component by the light receiving unit 17, transmitted light which passes through the component and so forth are detected. Incidentally, the respective capillaries 14 of the capillary array 13 are adjusted so as to have the same length. In addition, it is desirable to arrange the respective capillaries by uniformly separating from one another except the light irradiation area for improvement of heat dissipation characteristics.

Figure 2:
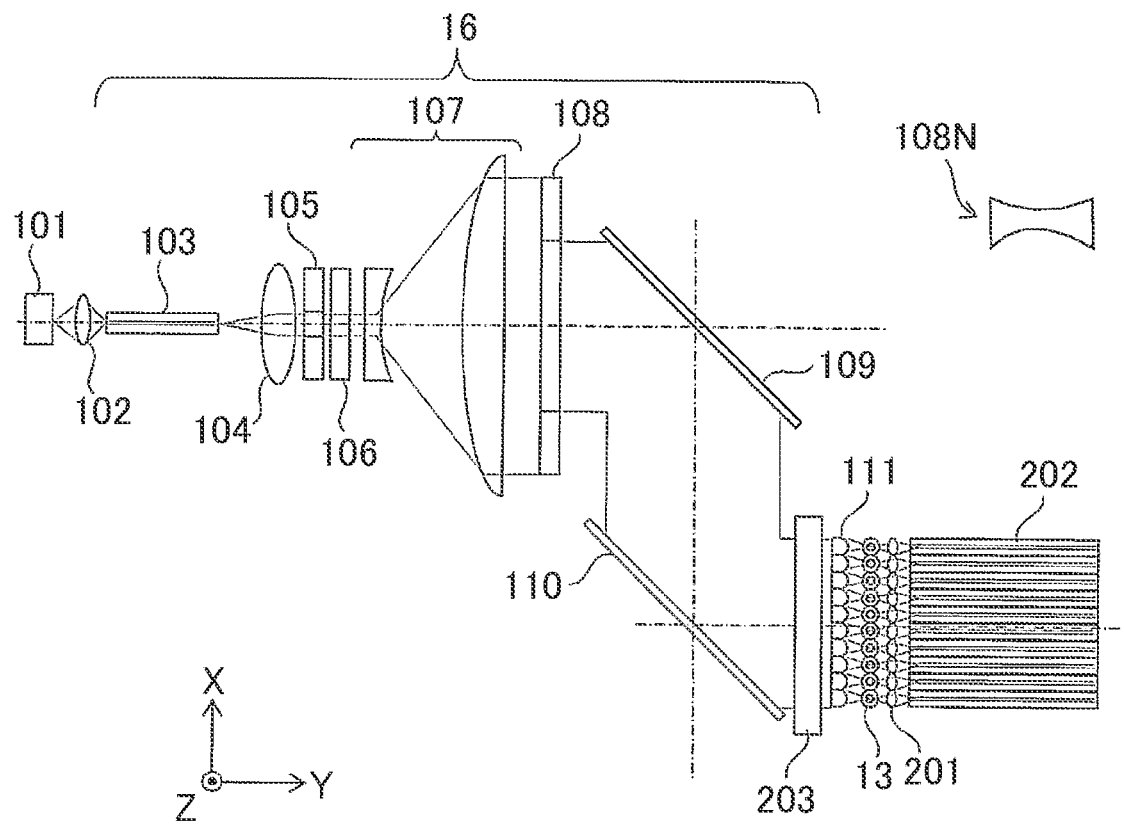
FIG. 2 is a schematic diagram (a plan view) illustrating a configuration example of a measurement light irradiation unit and a light receiving unit.
Figure 3:
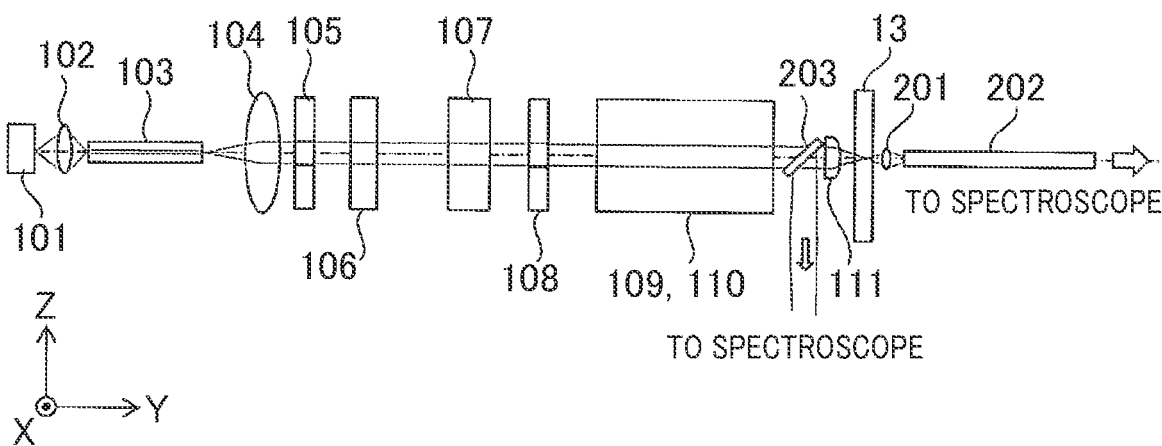
FIG. 3 is a schematic diagram (a sectional diagram) illustrating a configuration example of the measurement light irradiation unit and the light receiving unit.

FIG. 2 and FIG. 3 illustrate configuration examples of the measurement light irradiation unit 16 and the light receiving unit 17 of the first embodiment. FIG. 2 is a plan view, and FIG. 3 is a sectional diagram. The measurement light irradiation unit in this FIG. 2 has a configuration which is favorable to uniformly irradiate the plurality of capillaries 14 which are arrayed in line in the capillary array 13 with the measurement light. In addition, the present device is configured to be able to execute fluorescence measurement and absorbance measurement of proteins by the same capillaries. According to the present device, the fluorescence measurement and the absorbance measurement can be measured with no replacement of the capillary array 13.

The measurement light irradiation unit 16 in the example in this FIG. 2 is equipped with a light source 101, a light collection lens 102, a light-source-side fiber 103, a collimate lens 104, a rectangular mask 105, a wavelength selection filter 106, a cylindrical beam expander 107, a rectangular mask 108, mirrors 109, 110, and a toroidal lens array 111. The light collection lens 102 is configured to collect light from the light source 101 on an incident end face of the light-source-side fiber 103. The collimate lens 104 converts light which is emitted from an outgoing end face of the light-source-side fiber 103 to parallel light. The rectangular mask 105 is a mask which converges the parallel light which is emitted from the collimate lens 104 to rectangular light. The wavelength selection filter 106 has a function of selecting a wavelength which is made to pass in accordance with the kind of measurement (the absorbance measurement, the fluorescence measurement).

The cylindrical beam expander 107 is an optical system which includes a cylindrical lens, and is configured to expand a rectangular beam which is made to pass through the rectangular mask 105 in a direction along the array of the capillary array 13. Light which has passed through the cylindrical beam expander 107 passes through a rectangular opening in the rectangular mask 108, and is incident upon the toroidal lens array 111 via the mirrors 109, 110. The toroidal lens array 111 has a plurality of toroidal lenses which are arrayed with a direction which is the same as a longitudinal direction of the light irradiation part of the capillaries 14 in the capillary array 13 being set as a longitudinal direction. Incidentally, it is also possible to adopt a lens array that ordinary lenses are arrayed in place of the toroidal lenses depending on array intervals of the capillary array 13 and other situations.

According to the configuration of this measurement light irradiation unit 16, the light which is emitted from the light source 101 is shaped into a rectangular form by the cylindrical beam expander 107 and the rectangular masks 105, 108 in accordance with the array of the capillary array 13. The beam is expanded by the cylindrical beam expander 107 and thereby luminances of the beam are mutually equalized across its section and an intensity variation in the array direction of the capillary array 13 is suppressed. Further, the light which is equalized in luminance thereof is incident upon the corresponding capillary 14 in the capillary array 13 via the toroidal lens in the toroidal lens array 111. The luminances are mutually equalized across the beam section and thereby light amounts of light which is incident upon the respective capillaries 14 are also mutually equalized. That is, since it becomes possible to almost equalize the light amounts of the incident light among the plurality of capillaries 14, also in a case where the plurality of capillaries 14 are used, measurement conditions thereof are mutually equalized and measurement can be executed on the plurality of capillaries 14 simultaneously.

In addition, the light receiving unit 17 is equipped with a lens array 201 and an optical fiber array 202. The lens array 201 is configured to collect the measurement light which passes through the capillary array 13 and thereby to collect it on incidence end faces of optical fibers in the optical fiber array. The lens array 201 is configured by arraying lenses of the number which corresponds to the number of the toroidal lenses in the toroidal lens array 111. The optical fiber array 202 is formed by arraying a plurality of optical fibers of the number which corresponds to the number of lenses in the lens array 201 and guides light which is incident from the lens array 201 and makes it incident upon a spectroscope (not illustrated), and the light is detected by a photodetector (not illustrated).

In addition, a fluorescence-use dichroic mirror 203 is arranged between the mirror 110 and the toroidal lens array 111. This fluorescence-use dichroic mirror 203 has a function of making the measurement light which reaches from the light source 101 by being reflected from the mirrors 109 and 110 pass and, on the other hand, making fluorescence which is emitted from the capillary array 13 reflect in a case where the fluorescence measurement is performed in the present device. The fluorescence which is reflected from the fluorescence-use dichroic mirror 203 is incident upon the spectroscope via an optical system (not illustrated) and is detected.

According to the capillary electrophoresis apparatus of the first embodiment, the luminances of the incident light can be mutually equalized among the plurality of capillaries 14, and the absorbance of the protein can be measured with a high throughput. The light which is emitted from the light source 101 is shaped into the rectangular form by the cylindrical beam expander 107 and the rectangular masks 105, 108 in accordance with the array of the capillary array 13. The beam is expanded by the cylindrical beam expander 107 and thereby the luminances of the beam are mutually equalized across the section thereof. Further, the light which is equalized in luminance is incident upon the corresponding capillary in the capillary array 13 via the toroidal lens in the toroidal lens array. The light amounts of the light which is incident upon the respective capillaries are also mutually equalized by mutually equalizing the luminances across the beam section. That is, since it becomes possible to almost equalize the light amounts of the incident light mutually among the plurality of capillaries 14, also in a case where the plurality of capillaries 14 are used, the measurement conditions thereof are mutually equalized.

Incidentally, although the form of the openings of the rectangular masks 105 and 108 can be shaped into a rectangle that corresponding sides are parallel with each other, it may be made as a pincushion opening 108N that its width is increased as it goes toward an end as illustrated on the upper right in FIG. 2, instead of this. The capillary which is located on the end of the capillary array 13 has a tendency that the luminance of the measurement light which is received becomes small in comparison with the central capillary 14. It becomes possible to correct such a variation in luminance by this pincushion opening. Incidentally, although the lens array is used in the example, an image may be formed by using a single lens.

Second Embodiment

Figure 4:
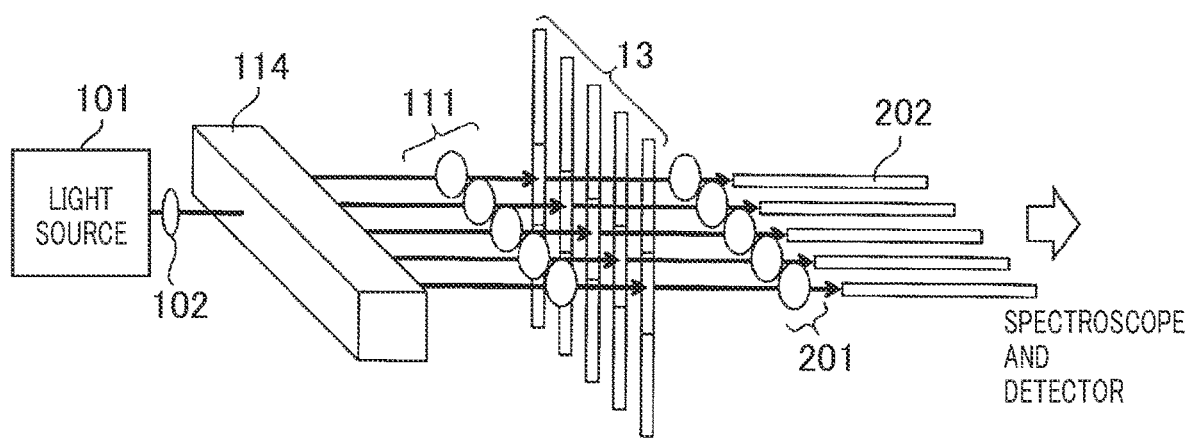
FIG. 4 is a schematic diagram illustrating a configuration example of a measurement light irradiation unit and a light receiving unit of a capillary electrophoresis apparatus of a second embodiment.

Next, a capillary electrophoresis apparatus according to the second embodiment of the present invention will be described with reference to FIG. 4. The entire configuration of the capillary electrophoresis apparatus of the second embodiment is the same as that in the first embodiment (FIG. 1). This second embodiment is different from the first embodiment in the configuration of the measurement light irradiation unit 16. Incidentally, since the symbols which are the same as those in FIG. 2 and FIG. 3 are assigned to constitutional elements which are common to constitutional elements of the measurement light irradiation unit 16 of the first embodiment, in the following, duplicated description is omitted.

The measurement light irradiation unit 16 of this second embodiment is equipped with the light source 101, the light collection lens 102, a light branch circuit 114, and the toroidal lens array 111. The light branch circuit 114 is provided between the light collection lens 102 and the toroidal lens array 111 and has a function of branching light from the light source 101 to a plurality of routes. Incidentally, although illustration is omitted in FIG. 4, also in this second embodiment, it is possible to provide a fluorescence-measurement-use light receiving optical system which includes the fluorescence-use dichroic mirror 203 for the fluorescence measurement.

In the aforementioned first embodiment, the light from the light source 101 is expanded in the array direction of the capillary array 13 by the cylindrical beam expander 107 and is divided into light fluxes of the number which corresponds to the number of the capillaries 14 in the capillary array 13 in the toroidal lens array 111. In contrast, in the second embodiment, the light branch circuit 114 has a role of dividing the light, and the measurement light is divided into light fluxes of the number which corresponds to the number of the capillaries in the capillary array 13 before the light is incident upon the toroidal lens array 111.

Figure 5:
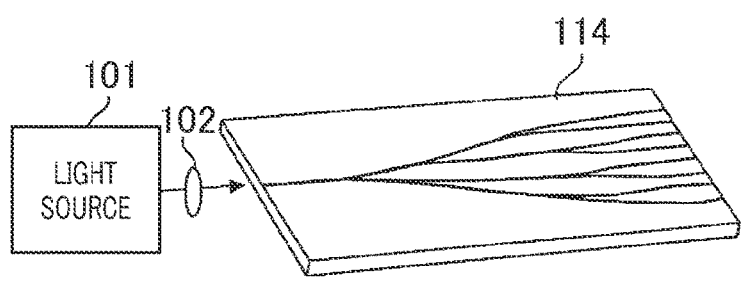
FIG. 5 illustrates one example of a light branch circuit of the second embodiment.
Figure 6:
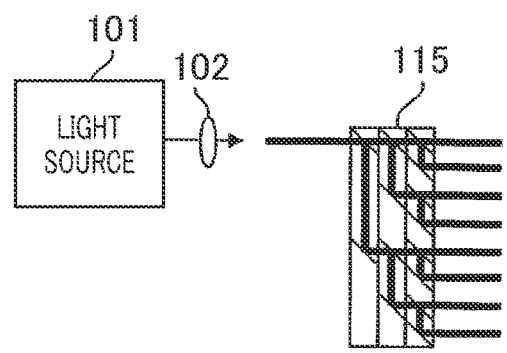
FIG. 6 illustrates one example of the light branch circuit of the second embodiment.

The light branch circuit 114 may be an optical waveguide such as that which is illustrated in FIG. 5 and may be a prism array 115 such as that which is illustrated in FIG. 6. It is possible to exhibit the effect which is the same as that of the first embodiment also by this second embodiment.

Third Embodiment

Figure 7:
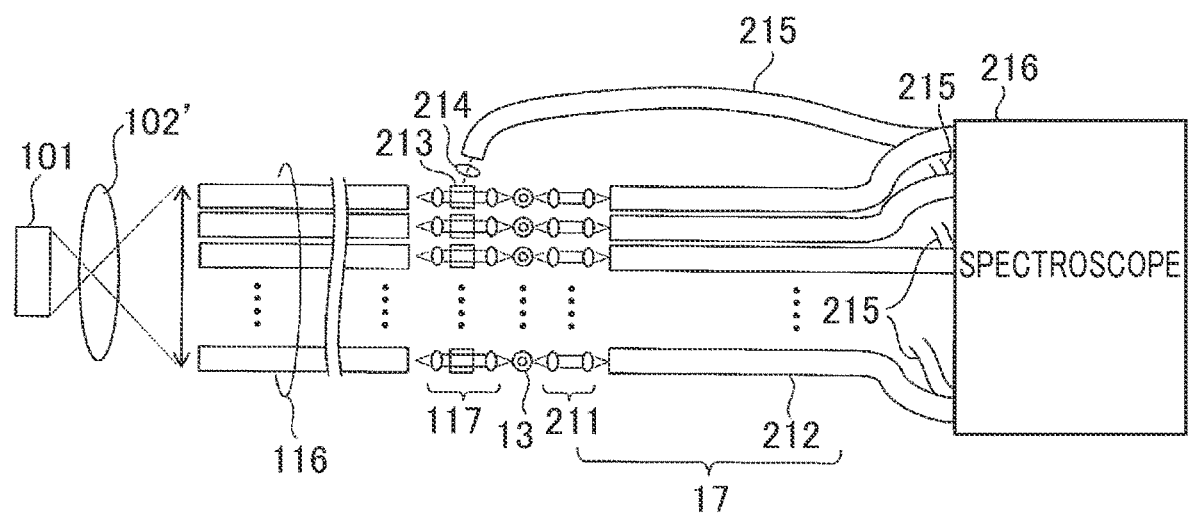
FIG. 7 is a schematic diagram illustrating a configuration example of a measurement light irradiation unit and a light receiving unit of a capillary electrophoresis apparatus of a third embodiment.

Next, a capillary electrophoresis apparatus according to the third embodiment of the present invention will be described with reference to FIG. 7. The entire structure of the capillary electrophoresis apparatus of this third embodiment is the same as that in the first embodiment (FIG. 1). This third embodiment is different from the first embodiment in the configurations of the measurement light irradiation unit 16 and the light receiving unit 17.

In the capillary electrophoresis apparatus of the third embodiment, the measurement light irradiation unit 16 is equipped with the light source 101, a light collection lens 102', an optical fiber array 116, and a light collection optical system 117. This measurement light irradiation unit 16 divides the light into a plurality of streaks of light by the optical fiber array 116 which is configured by arraying a plurality of optical fibers. The optical fiber array 116 is configured by arraying the plurality of optical fibers conforming with the array of the capillaries 14, and the number of the capillaries 14. However, the optical fibers in the optical fiber array 116 may be arrayed in correspondence with the array of the capillaries 14 in the capillary array 13 on the outgoing end sides thereof, may be arrayed so as to make highly efficient incidence of incident light from the light collection lens 102' possible on the incident end sides, and there is no need to make it correspond to the array in the capillary array 13. Incidentally, in the plurality of optical fibers in the optical fiber array 116, one or the plurality of optical fibers can be also used as the optical fiber(s) for guiding reference light. On the incidence end side of the optical fiber array 116, it is also effective to form it as an optical fiber array which reduces loss by treating it by a melting end method and then getting rid of adhesives.

In addition, each of the plurality of optical fibers in the optical fiber array 116 may be further a bundle fiber which is an assembly of the plurality of optical fibers. Incidentally, the plurality of optical fibers in one bundle fiber may be arrayed in a circle or in a matrix (a plurality of rows×a plurality of columns) at incidence ends, and on the other hand, may be arranged a line on the outgoing end sides. It becomes possible to make the light incident upon the capillaries 14 easily and highly efficiently by arranging the optical fibers on the outgoing end side in a line in a longitudinal direction of the capillaries 14.

The light from the light source 101 is collected by the light collection lens 102' and the light collection lens 102' forms an image of the light source 101 on the incidence end side of the optical fiber array 116. Incidentally, although illustration is omitted, the light collection lens 102' may be equipped with a plurality of lenses and, in addition, may be further equipped with a light diffusion element for dispersing the light uniformly.

In addition, the light receiving unit 17 of this third embodiment is equipped with a light collection optical system 211, an optical fiber array 212, a fluorescence-use beam splitter array 213, a light collection lens array 214, and an optical fiber array 215. The light collection optical system 211 is configured to collect the measurement light which has passed through the capillary array 13 and to make it incident upon an incidence end face of the optical fiber array 212. The optical fiber array 212 has a function of guiding the light which is collected by the light collection optical system 211 toward a spectroscope 216. The light which has passed through the optical fiber array 212 is incident upon the spectroscope 216 as the light for the absorbance measurement.

On the other hand, when the measurement light for the fluorescence measurement (fluorescence excitation light) is emitted from the light source 101 and is incident upon the capillary array 13, fluorescence generates from a phosphor which is applied to the protein which passes in the capillaries 14. Each of the fluorescence-use splitter array 213 has a function of reflecting this fluorescence. The fluorescence-use beam splitter array 213 is configured to make the measurement light for the fluorescence measurement transmit.

The light which is reflected from the fluorescence-use beam splitter array 213 is collected by each of the light collection lens array 214, is incident upon incidence end faces of optical fibers of the optical fiber array 215 and is guided to the spectroscope 216.

According to the capillary electrophoresis apparatus of this third embodiment, since a light source image of the light source 101 is formed on an incidence end face of the optical fiber array 116 via the light collection lens 102', it becomes possible to almost equalize the luminances of streaks of incident light into the plurality of optical fibers of the optical fiber array 116.

Therefore, the plurality of capillaries 14 of the capillary array 13 can be irradiated with the streaks of light which are uniform in luminance and even in a case where the plurality of capillaries are used, it becomes possible to perform high-throughput and accurate measurement.

Fourth Embodiment

Figure 8:
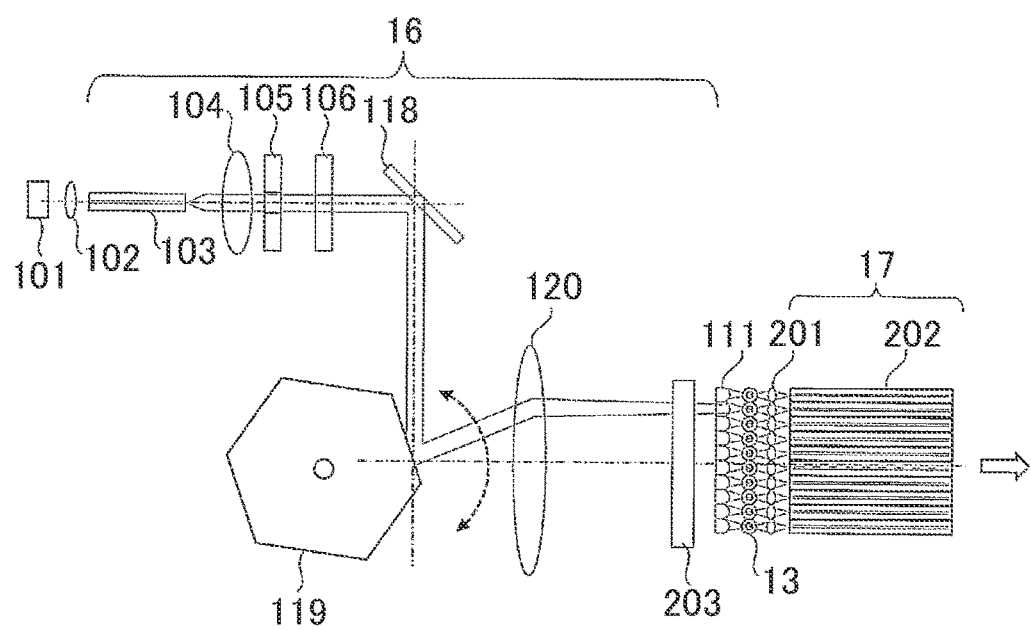
FIG. 8 is a schematic diagram illustrating a configuration example of a measurement light irradiation unit and a light receiving unit of a capillary electrophoresis apparatus of a fourth embodiment.

Next, a capillary electrophoresis apparatus according to the fourth embodiment of the present invention will be described with reference to FIG. 8. The entire structure of the capillary electrophoresis apparatus of this fourth embodiment is the same as that in the first embodiment (FIG. 1). This fourth embodiment is different from the first embodiment in the configuration of the measurement light irradiation unit 16.

The measurement light irradiation unit 16 of this fourth embodiment is equipped with the light source 101, the light collection lens 102, the light-source-side fiber 103, the collimate lens 104, the rectangular mask 105, the wavelength selection filter 106, a mirror 118, a polygon mirror 119, an fθ lens 120, and the toroidal lens array 111.

The light source 101 to the wavelength selection filter 106 may be the same as those in the first embodiment. Measurement light which is emitted from the light source 101, is subjected to beam forming via the rectangular mask 105 and is reflected from the mirror 118 is scanned by the polygon mirror 119 which rotates at a predetermined speed about an axis of rotation at a predetermined rotation angle. The scanned light ray is converted to light which is parallel with an optical axis by the fθ lens 120. The measurement light is scanned by a light scanning unit which is configured by the polygon mirror 119 and the fθ lens 120 and thereby streaks of the measurement light are sequentially incident upon the plurality of toroidal lenses of the toroidal lens array 111. Although in the aforementioned embodiments, the streaks of the measurement light are incident upon the plurality of toroidal lenses in the toroidal lens array 111 simultaneously, in this fourth embodiment, the measurement light is incident upon any one of the plurality of toroidal lenses not simultaneously but sequentially. Although measurement light projection timings are different from one another among the plurality of capillaries, it becomes possible to perform measurement under almost the same conditions of the plurality of capillaries 14 with no influence of a difference in projection time by increasing a rotation speed of the polygon mirror 119. Therefore, also in this fourth embodiment, it becomes possible to perform the absorbance measurement of the protein using the plurality of capillaries with the high throughput.

Figure 9:
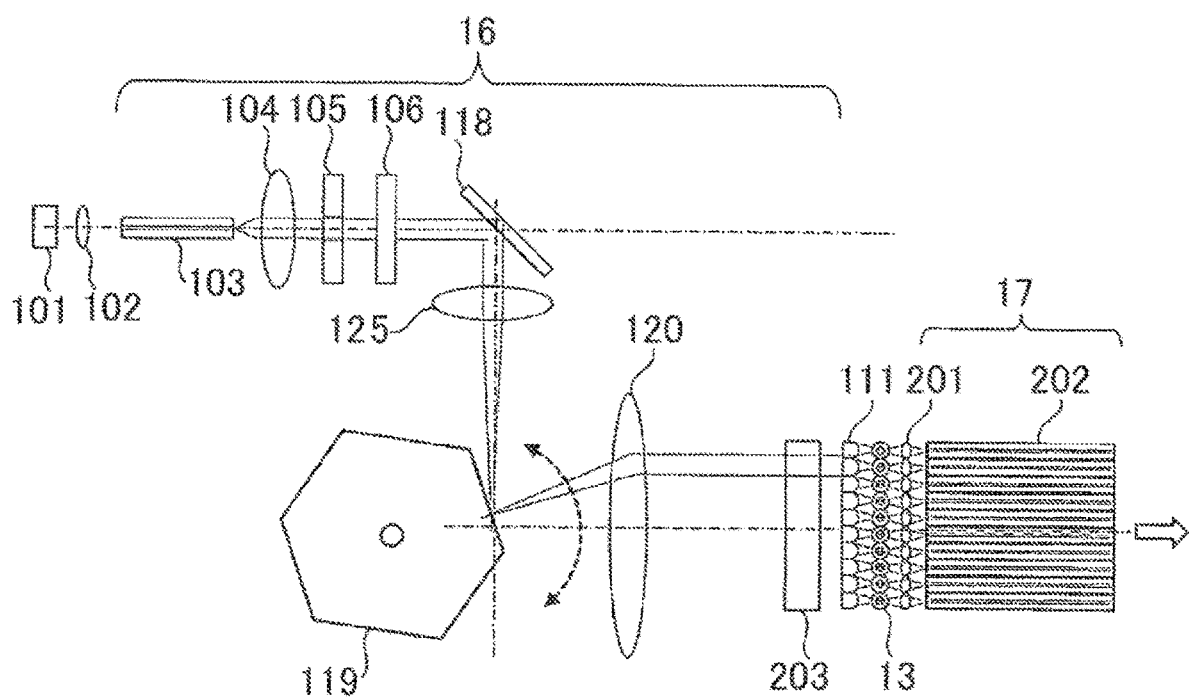
FIG. 9 illustrates a modified example of the fourth embodiment.

FIG. 9 illustrates a modified example of the fourth embodiment. In this modified example, in addition to the configurations in FIG. 8, further, a light collection lens 125 is provided between the mirror 118 and the polygon mirror 119. This light collection lens 125 has a function of adjusting the light which is outgone from the fθ lens 120 so as to become parallel light along the optical axis. The light which is outgone from the fθ lens 120 becomes the parallel light and thereby it becomes possible to make the measurement light incident upon the toroidal lens array 111 and the light irradiation area of the capillary array 13 highly efficiently.

Fifth Embodiment

Figure 10:
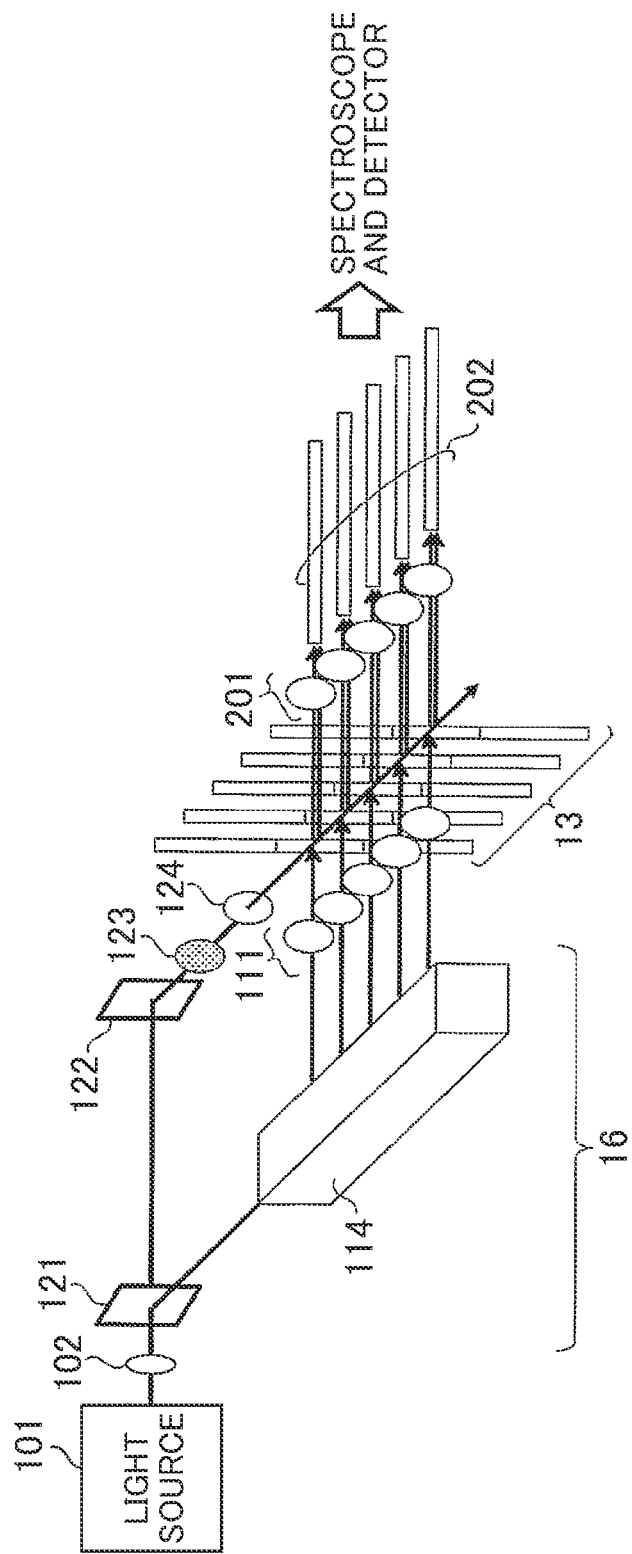
FIG. 10 is a schematic diagram illustrating a configuration example of a measurement light irradiation unit of a capillary electrophoresis apparatus of a fifth embodiment.

Next, a capillary electrophoresis apparatus according to the fifth embodiment of the present invention will be described with reference to FIG. 10. The entire structure of the capillary electrophoresis apparatus of this fifth embodiment is the same as that in the first embodiment (FIG. 1). This fifth embodiment is different from the aforementioned embodiments in the configuration of the measurement light irradiation unit 16.

The measurement light irradiation unit 16 of this fifth embodiment is equipped with the light source 101, the light collection lens 102, a dichroic mirror 121, the light branch circuit 114, the toroidal lens array 111, a dichroic mirror 122, an excitation wavelength monochromatization filter 123, and a light collection lens 124. The light source 101, the light collection lens 102, and the light branch circuit 114 may be the same as those in the second embodiment (FIG. 4).

In the aforementioned embodiments, the configuration that the measurement light for the absorbance measurement and the measurement light for the fluorescence measurement are projected onto the capillary array 13 along the same projection optical path. In contrast, in this fifth embodiment, the measurement light for the fluorescence measurement is projected along a projection optical path which is different from that of the measurement light for the absorbance measurement. That is, the measurement light irradiation unit 16 of this fifth embodiment makes the measurement light for the fluorescence measurement transmit through the dichroic mirror 121 first and then, on the other hand, makes the measurement light for the absorbance measurement reflect therefrom. The measurement light for the absorbance measurement is branched into a plurality of light fluxes by the light branch circuit 114 similarly to that in the second embodiment and is incident upon the toroidal lens array 111.

On the other hand, the measurement light for the fluorescence measurement passes through the dichroic mirror 121 and then is reflected from the dichroic mirror 122 and only light of a wavelength component which is used for the fluorescence measurement passes through the excitation wavelength monochromatization filter 124. One light flux of the measurement light for the fluorescence measurement which has passed through the excitation wavelength monochromatization filter 124 does not pass through the toroidal lens array 111 and is incident upon the plurality of capillaries 14 in the capillary array 13 from its array direction as illustrated in FIG. 10. Incidentally, the dichroic mirror 122 can be made as the one which has such a wavelength characteristic that it makes a near infrared ray which is unnecessary for the fluorescence measurement transmit.

When the protein to which the phosphor is added passes in the capillary 14 and emits the fluorescence by being irradiated with the measurement light for the fluorescence measurement, that fluorescence is incident upon the lens array 201 and is guided to a spectroscope by the optical fiber array 202. Since the measurement light for the fluorescence measurement is guided in a direction (the array direction of the plurality of capillaries 14 of the capillary array 13) which is parallel with a principal plane of the lens array 201, the measurement light is scarcely made incident upon the lens array 201. Therefore, according to this fifth embodiment, the fluorescence measurement can be executed in a high S/N ratio.

Since the absorbance measurement can be executed also by this fifth embodiment in the same manner as those in the aforementioned embodiments and the absorbance measurement can be executed on the plurality of capillaries simultaneously under conditions which are the same as one another, the absorbance measurement with the high throughput becomes possible. In addition, since it is configured to irradiate the plurality of capillaries 14 which are arrayed in a line with one streak of the measurement light for the fluorescence measurement from the array direction thereof as for the fluorescence measurement, it becomes possible to perform the measurement on the plurality of capillaries 14 simultaneously.

Figure 11:
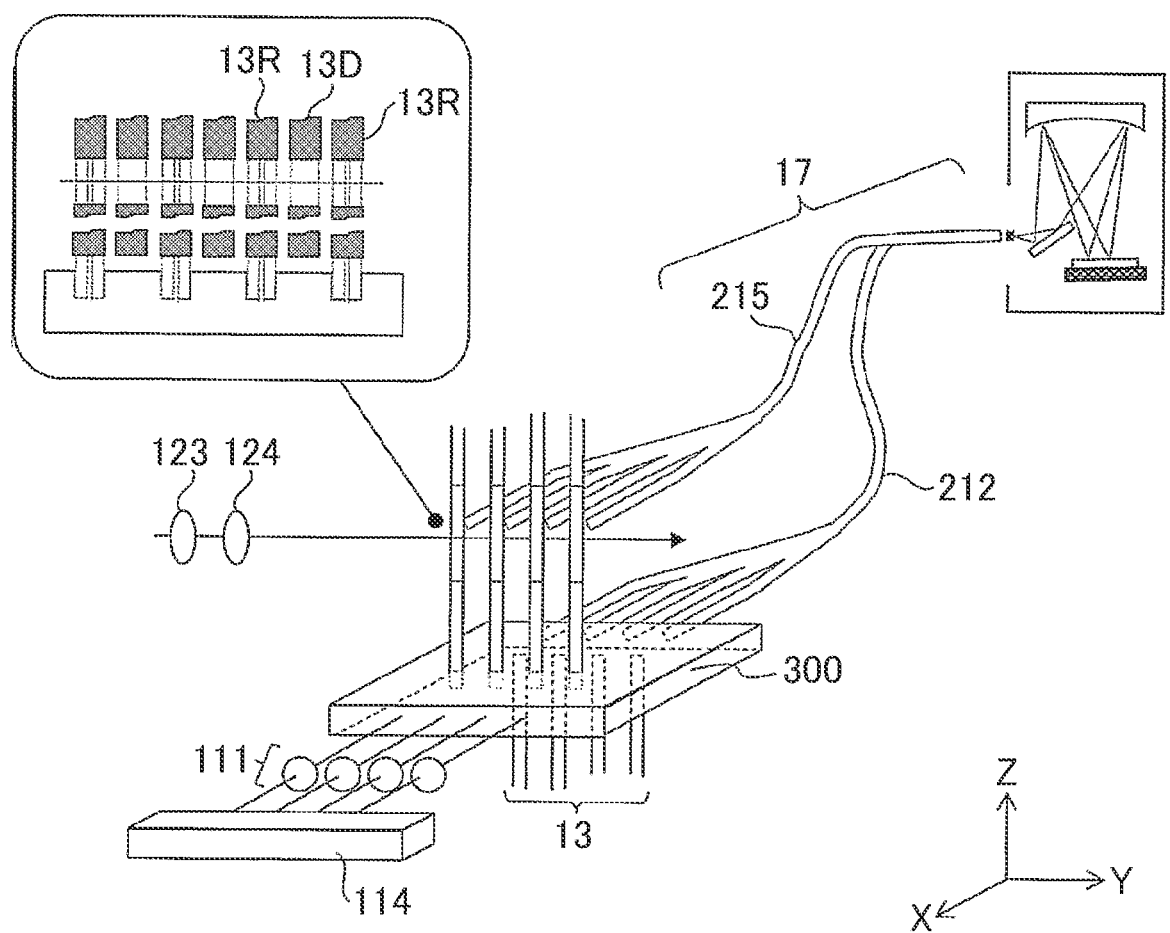
FIG. 11 illustrates a modified example of the fifth embodiment.

FIG. 11 illustrates a modified example of the fifth embodiment. In the modified example, the positions of the plurality of capillaries which are irradiated with the measurement light for the fluorescence measurement are different from the positions of the plurality of capillaries which are irradiated with the measurement light for the absorbance measurement. Different types of measurement can be executed with no mutual interference and the throughput of the measurement can be more improved by making the irradiation positions (passage positions) of the measurement light for the absorbance measurement and the measurement light for the fluorescence measurement different from each other in this way. Incidentally, in coping with that the irradiation positions are different from each other, the light receiving unit 17 has the optical fiber array 212 for guiding transmitted light in the measurement light for the fluorescence measurement and the optical fiber array 215 for guiding the fluorescence which generates in the capillaries 14 by the fluorescence measurement. In addition, in FIG. 11, phoresis paths of the capillaries 14 are arranged so as to become a so-called Z shape in the absorbance measurement. That is, a Z-type flow path array unit 300 that a hollow part which is opened at the both ends is provided in an opaque insulator block, both opening ends are sealed with transparent window materials and a plurality of flow paths which are provided with holes which lead to the outside of the insulator are arranged on the both ends of the hollow part is provided and the capillaries 14 are connected to a plurality of holes so as to configure as the electrophoresis paths. An optical path length for the absorbance measurement can be made long in comparison with an optical path length for the fluorescence measurement by making a diameter of the hollow part sufficiently small. Sensitivity can be improved by performing reflective coating treatment on an inner face of the hollow part.

Incidentally, in this fifth embodiment and the modified example, as illustrated on the upper left in FIG. 11, the capillary array 13 can be formed as the one that in addition to capillaries 13R which serve as phoresis paths of samples, a dummy capillary 13D is appropriately arranged between them. In this case, the measurement light for the fluorescence measurement passes through the capillaries 13R and the dummy capillaries 13D. Although the capillaries 13R are arranged at predetermined intervals leaving a space, in this case, when the measurement light for the fluorescence measurement is made incident upon it as illustrated in FIG. 10, propagation of the measurement light becomes difficult. Propagation of the measurement light becomes easy by arranging the dummy capillary 13D between the capillaries 13R. Incidentally, as the dummy capillary, a glass rod and so forth can be used in addition to a capillary the inside of which is filled with a polymer and which is the same as that in sectional form.

Sixth Embodiment

Figure 12:
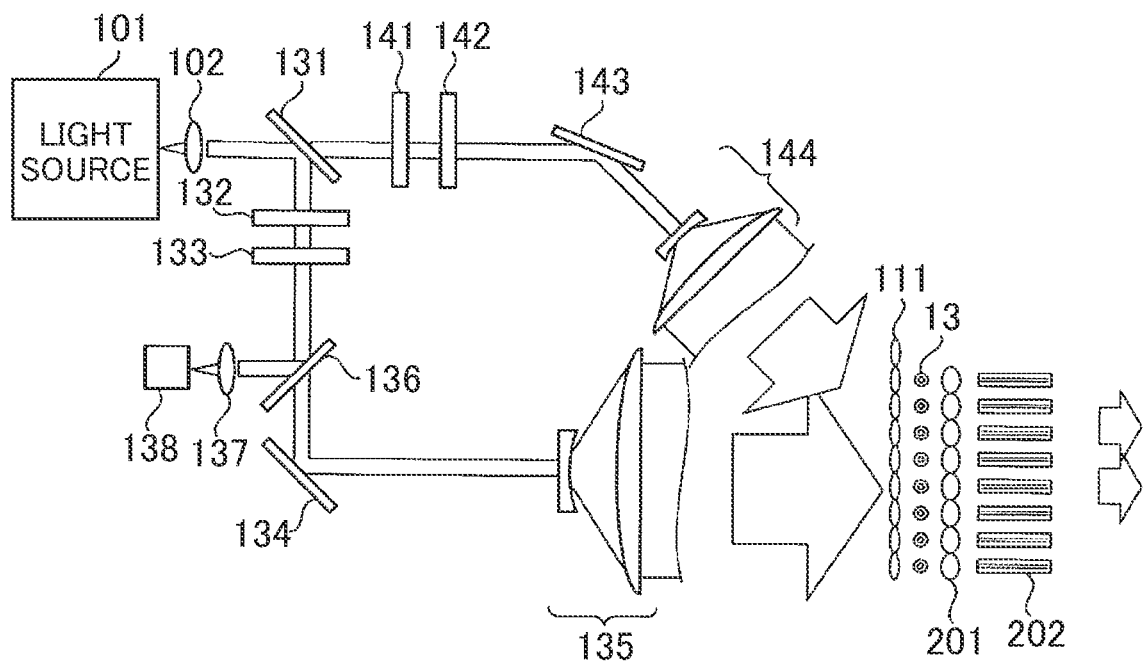
FIG. 12 is a schematic diagram illustrating a configuration example of a measurement light irradiation unit and a light receiving unit of a capillary electrophoresis apparatus of a sixth embodiment.

Next, a capillary electrophoresis apparatus according to the sixth embodiment of the present invention will be described with reference to FIG. 12. The entire structure of the capillary electrophoresis apparatus of this sixth embodiment is the same as that of the first embodiment (FIG. 1). This sixth embodiment is different from the aforementioned embodiments in the configuration of the measurement light irradiation unit 16. This sixth embodiment is, projection paths of the measurement light for the absorbance measurement and the measurement light for the fluorescence measurement have mutually different configurations, has a commonality with the fifth embodiment in this respect. However, in this sixth embodiment, it is configured that the measurement light (excitation light) for the fluorescence measurement is made incident from an oblique direction relative to the principal plane of the toroidal lens array 111.

The measurement light irradiation unit 16 of the capillary electrophoresis apparatus of the sixth embodiment is equipped with the light source 101, the light collection lens 102, a dichroic mirror 131, a shutter 132, an absorbance-measurement-light-use optical filter 133, a mirror 134, a cylindrical beam expander 135, and the toroidal lens array 111. In addition, the measurement light irradiation unit 16 is equipped with a shutter 141, a fluorescence-excitation-use optical filter 142, a mirror 143, and a cylindrical beam expander 144. The light source 101 to the cylindrical beam expander 135 are an optical system adapted for irradiation with the measurement light for the absorbance measurement, and the light source 101 to the cylindrical beam expander 144 are an optical system adapted for irradiation with the measurement light for the fluorescence measurement.

The shutter 132 is evacuated from an optical path thereof in a case where the absorbance measurement is performed and is inserted into the optical path in a case where the fluorescence measurement is performed. The absorbance-measurement-use optical filter 133 has a function of passing only light of a wavelength range for the absorbance measurement. The cylindrical beam expander 135 may be the same as the cylindrical beam expander 107 of the first embodiment. Incidentally, a beam splitter 136, a light collection lens 137, and a photodetector 138 are provided between the absorbance-measurement-use optical filter 133 and the mirror 134 in order to monitor the measurement light for the absorbance measurement.

The shutter 141 is evacuated from an optical path thereof in a case where the fluorescence measurement is performed and is inserted into the optical path in a case where the absorbance measurement is performed. That is, the shutters 132 and 141 are in a relation that either one of them is selectively inserted into the corresponding optical path and the other is evacuated therefrom. The fluorescence-measurement-use optical filter 142 has a function of passing only light of a wavelength range used for the fluorescence measurement. The cylindrical beam expander 144 may be the same as the cylindrical beam expander 107 of the first embodiment.

The absorbance-measurement-use cylindrical beam expander 135 is configured to project the measurement light almost vertically relative to principal planes of toroidal lenses of the toroidal lens array 111. On the other hand, the fluorescence-measurement-use cylindrical beam expander 144 is configured to project the measurement light obliquely relative to the principal planes of the toroidal lenses of the toroidal lens array 111. That is, in this embodiment, the measurement light for the absorbance measurement and the measurement light for the fluorescence measurement are projected at different angles relative to the toroidal lens array 111. In the illustrated example, although the former is made incident vertically and the latter is made incident in an oblique direction relative to the principal planes of the toroidal lenses of the toroidal lens array 111, it is not limited to this. The latter may be made incident from the oblique direction and the former may be set at an incidence angle which is different from that of the latter.

Figure 13:
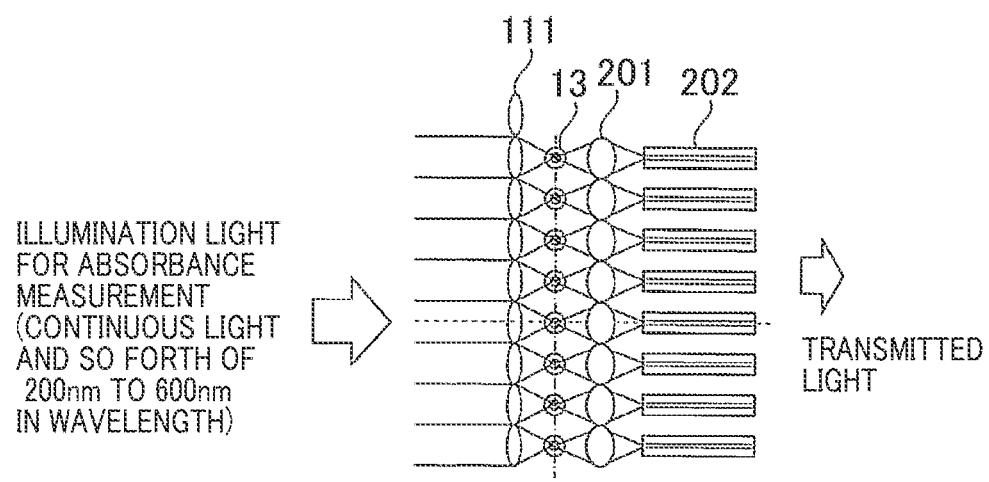
FIG. 13 illustrates an operation of the sixth embodiment.

An operation of this sixth embodiment will be described with reference to FIG. 13 to FIG. 15. In a case where the absorbance measurement is performed, the shutter 132 is evacuated to the outside of the optical path and the shutter 141 is inserted into the optical path as aforementioned. The measurement light for the absorbance measurement passes through the light source 101 to the mirror 134, is expanded in the array direction of the plurality of capillaries 14 of the capillary array 13 by the cylindrical beam expander 135, is incident almost vertically relative to the principal plane of the toroidal lens array 111 and uniformly irradiates the plurality of capillaries 14 of the capillary array 13. Thereby, the absorbance measurement can be performed in the same manner as those in the aforementioned embodiments.

On the other hand, in a case where the fluorescence measurement is performed, the shutter 141 is evacuated to the outside of the optical path and the shutter 132 is inserted into the optical path as aforementioned. The measurement light for the fluorescence measurement passes through the light source 101 to the mirror 143, is expanded in the array direction of the plurality of capillaries of the capillary array 13 by the cylindrical beam expander 144, and is incident from the oblique direction relative to the lens principal planes of the toroidal lens array 111 as illustrated in FIG. 14. Thereby, the plurality of capillaries in the capillary array 111 are uniformly irradiated with the measurement light for the fluorescence measurement from the oblique direction. The fluorescence which is emitted from the protein and so forth which migrate in the capillaries by irradiation of this measurement light is incident upon the lens array 201 and is guided to a spectroscope (not illustrated) by the optical fiber array 202. Since the measurement light for the fluorescence measurement is incident from oblique direction relative to the lens principal planes of the toroidal lens array 111, its incidence upon the lens array 201 and the optical fiber array 202 is avoided. Thereby, the S/N ratio of the fluorescence measurement can be improved.

Figure 14:
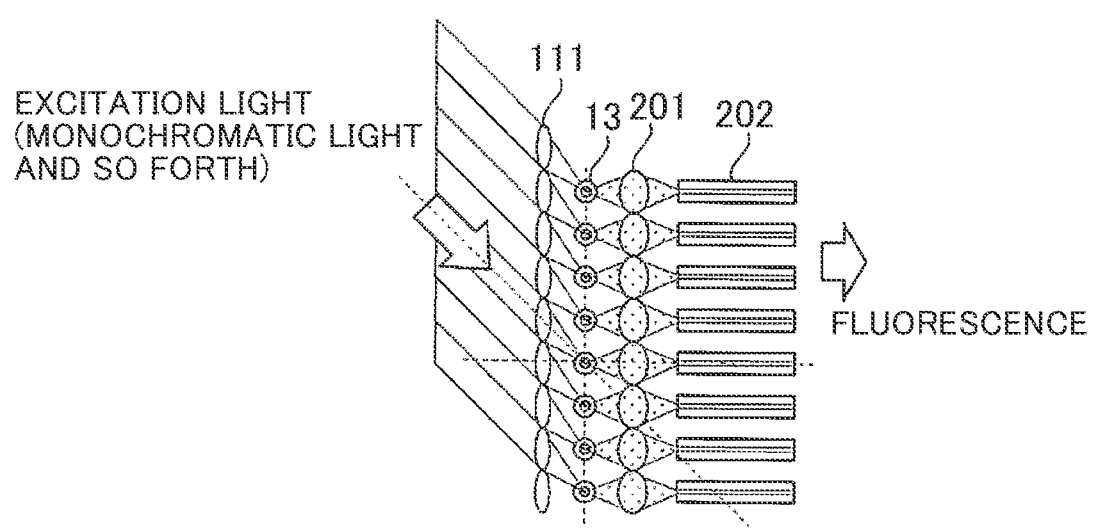
FIG. 14 illustrates an operation of the sixth embodiment.
Figure 15:
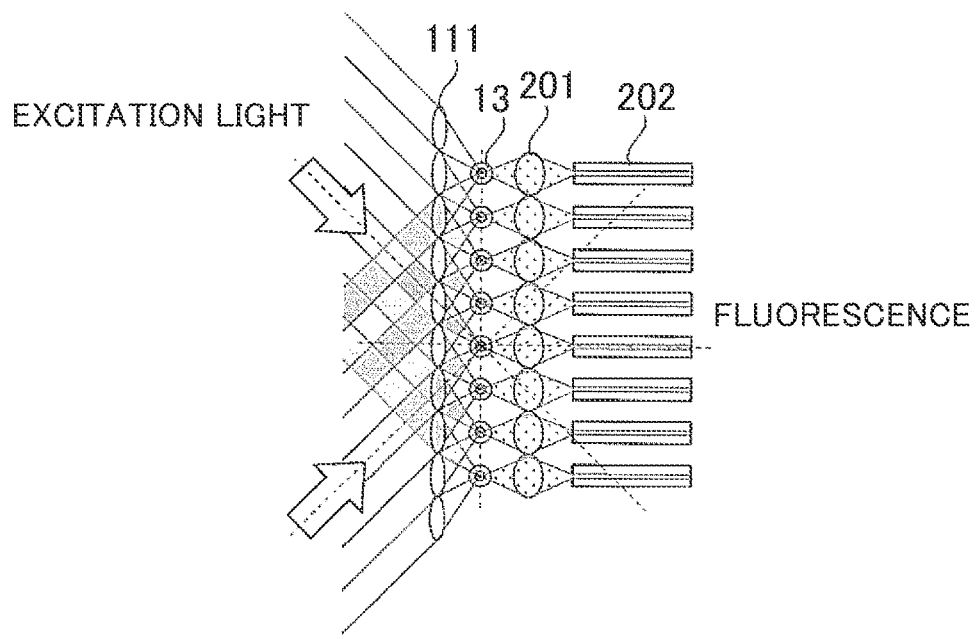
FIG. 15 illustrates an operation of the sixth embodiment.

Incidentally, the measurement light for the fluorescence measurement may be made incident from an oblique direction (an oblique left direction viewing from the toroidal lens array 111) which is opposite to that in FIG. 14 and may be made incident from both of the left and right sides of the toroidal lens example 111 as illustrated in FIG. 15.

[Others]

Figure 16:
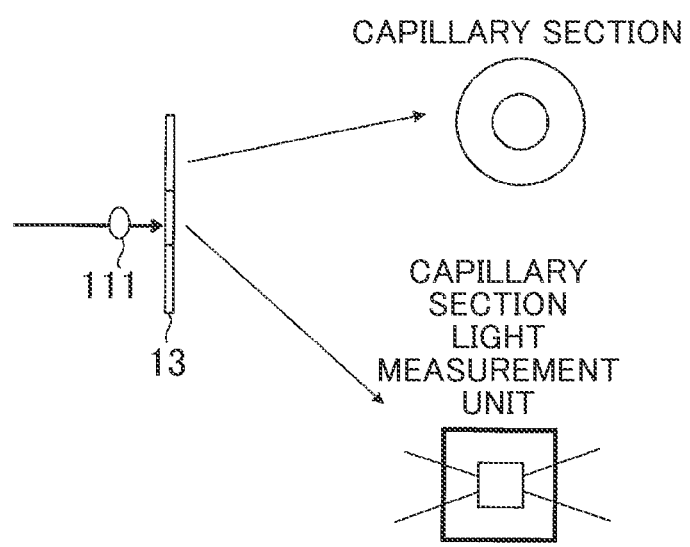
FIG. 16 is a modified example relating to a structure of a capillary.

In each of the above-described embodiments, the capillaries of the capillary array 13 are cylindrical glass tubes and are circular in section as illustrated on the upper right in FIG. 16. Incidentally, they are coated with polyimide and so forth except the light irradiation area. Instead of this, as illustrated on the lower right in FIG. 16, it is possible to form the section of the capillary into a rectangular shape and to adjust the measurement light irradiation unit 16 so as to almost vertically apply the measurement light to one side of the rectangular shape and to increase incident efficiency. An external form may be circular and an internal form may be a rectangular shape, and vice versa. Only the vicinity of the light irradiation area may be different in shape, in addition to the entire capillary.

Although several embodiments of the present invention have been described as above, these embodiments are presented as examples and there is no intention to limit the scope of the invention. These novel embodiments can be embodied in other various forms and various omissions, replacements and alterations can be made within the range not deviating from the gist of the invention. These embodiments and the modified examples thereof are included in the scope and the gist of the invention and included in the scopes of the invention which is described in the patent claims and equivalents thereof.

REFERENCE SIGNS LIST

1 . . . capillary electrophoresis apparatus, 11 . . . sample container, 12 . . . sample tray, 13 . . . capillary array, 14 . . . capillary, 15 . . . high-voltage power source, 16 . . . measurement light irradiation unit, 17 . . . light receiving unit, 18 . . . electrophoresis medium, 19 . . . pump unit, 20 . . . thermostatic bath, 21 . . . electrode bath, 22 . . . valve, 101 . . . light source, 102, 102' . . . light collection lens, 103 . . . light-source-side fiber, 104 . . . collimate lens, 105 . . . rectangular mask, 106 . . . wavelength selection filter, 107 . . . cylindrical beam expander, 108 . . . rectangular mask, 109, 110 . . . mirror, 111 . . . toroidal lens array, 114 . . . light branch circuit, 116 . . . optical fiber array, 117 . . . light collection optical system, 118 . . . mirror, 119 . . . polygon mirror, 120 . . . fθ lens, 121, 122 . . . dichroic mirror, 123 . . . excitation wavelength monochromatization filter, 124 . . . light collection lens, 125 . . . light collection lens, 1131 . . . dichroic mirror, 132 . . . shutter, 133 . . . absorbance-measurement-use optical filter 134 . . . mirror, 135 . . . cylindrical beam expander, 136 . . . beam splitter, 137 . . . light collection lens, 138 . . . photodetector, 141 . . . shutter, 142 . . . fluorescence-excitation-use optical filter, 143 . . . mirror, 144 . . . cylindrical beam expander, 201 . . . lens array, 202 . . . optical fiber array, 211 . . . light collection optical system, 212, 215 . . . optical fiber array, 213 . . . fluorescence-use beam splitter array, 214 . . . light collection lens array, 215 . . . optical fiber array, 216 . . . spectroscope

The invention claimed is:

1. An electrophoresis device, comprising:
a capillary array which is configured by arraying a plurality of capillaries;
a first lens array that includes a plurality of first lenses which are arrayed in correspondence with the plurality of capillaries;
a measurement light source that irradiates with a measurement light that is provided to the first lens array sequentially;
a second lens array that includes a plurality of second lenses which are arrayed in correspondence with the plurality of capillaries; and
a spectroscope that receives light irradiated by the measurement light source that incident upon the capillaries via the first lens array and the second lens array.

2. The electrophoresis device according to claim 1, wherein the measurement light includes
further a plurality of streaks of branched light that are each incident upon a respective capillary among the plurality of capillaries.

3. The electrophoresis device according to claim 2, wherein
the measurement light includes a component that makes fluorescence measurement possible.

4. The electrophoresis device according to claim 1, wherein
the measurement light is a rectangular beam.

5. The electrophoresis device according to claim 1, wherein the measurement light includes:
a first measurement light for absorbance measurement via the first lens array, and
a second measurement light for fluorescence measurement incident upon the plurality of capillaries without interposing the first lens array.

6. The electrophoresis device according to claim 1, wherein the spectroscope is configured to:
measure an absorbance measurement incident upon the first lens array at a first angle, and
measure a second measurement light for fluorescence measurement incident upon the first lens array at a second angle which is different from the first angle.

7. The electrophoresis device according to claim 1, wherein each of the capillaries in the capillary array are equipped with passages at least parts of external shape that is rectangular.

8. The electrophoresis device according to claim 1, wherein the capillaries in the capillary array are equipped with passages at least parts of external forms of which are rectangular.

9. An electrophoresis device, comprising:
a capillary array which is configured by arraying a plurality of capillaries;
a first light irradiation unit for absorbance measurement;
a second light irradiation unit for fluorescence measurement; and
a light receiving unit which receives light from the capillary array, wherein
a part of the capillary array which is irradiated by the first light irradiation unit and a part of the capillary array which is irradiated by the second light irradiation unit are different from each other in position and are different from each other in length of an optical path in the capillary.

* * * * *